US012779344B2

(12) United States Patent
Anderson et al.

(10) Patent No.: US 12,779,344 B2
(45) Date of Patent: Nov. 3, 2026

(54) PEER HIGHLIGHT GENERATION APPARATUS AND METHOD

(71) Applicant: Sony Interactive Entertainment Inc., Tokyo (JP)

(72) Inventors: Mark Anderson, London (GB); Nicholas Anthony Edward Ryan, London (GB); Alexei Smith, London (GB); Andrew William Walker, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 252 days.

(21) Appl. No.: 18/672,491

(22) Filed: May 23, 2024

(65) Prior Publication Data

US 2024/0399258 A1 Dec. 5, 2024

(30) Foreign Application Priority Data

Jun. 1, 2023 (GB) ..................................... 2308184

(51) Int. Cl.
*A63F 13/795* (2014.01)
*A63F 13/60* (2014.01)

(52) U.S. Cl.
CPC ............ *A63F 13/795* (2014.09); *A63F 13/60* (2014.09)

(58) Field of Classification Search
CPC ........ A63F 13/795; A63F 13/60; A63F 13/86; A63F 13/79; A63F 13/85
See application file for complete search history.

(56) References Cited

U.S. PATENT DOCUMENTS 10,363,488 B1 * 7/2019 Willette .................. A63F 13/63
11,062,569 B2 * 7/2021 Paradise ............... A63F 13/352
(Continued)

FOREIGN PATENT DOCUMENTS

WO 2017218303 A1 12/2017

OTHER PUBLICATIONS

Combined Search and Examination Report for corresponding GB Application No. GB2308184.7, 6 pages, dated Nov. 30, 2023.

*Primary Examiner* — Peter J Iannuzzi
(74) *Attorney, Agent, or Firm* — Kilpatrick Townsend & Stockton LLP

(57) ABSTRACT

A peer highlight generation apparatus comprises receiving circuitry configured to receive peer profile data associated with a user, wherein the peer profile data identifies one or more peer gaming profiles that are respectively associated with one or more peers, wherein each peer has participated with the user in one or more video game sessions; first generating circuitry configured to generate one or more candidate highlights of a given peer, wherein each candidate highlight comprises image data of one of the one or more video game sessions in which the user and the given peer participated together, wherein at least a part of each candidate highlight comprises image data of an in-game avatar of the given peer; selecting circuitry configured to select a highlight from among the one or more generated candidate highlights; and rendering circuitry configured to render, for display, a list of one or more of the peer gaming profiles, wherein the list comprises the peer gaming profile of the given peer, wherein the rendering circuitry is configured to render the list in dependence upon at least part of the received peer profile data; wherein the rendering circuitry is configured to render, for display, the selected highlight as (Continued)

part of an entry of the list that comprises the peer gaming profile of the given peer.

19 Claims, 2 Drawing Sheets

(56) References Cited

U.S. PATENT DOCUMENTS

| | | | | |
|---|---|---|---|---|
| 11,278,807 | B2 * | 3/2022 | Benedetto | A63F 13/35 |
| 2013/0057586 | A1 * | 3/2013 | Tsuda | A63F 13/655<br>345/635 |
| 2018/0140947 | A1 * | 5/2018 | Kunieda | G07F 17/3262 |
| 2020/0147500 | A1 * | 5/2020 | Mahlmeister | A63F 13/5378 |

* cited by examiner

PEER HIGHLIGHT GENERATION APPARATUS AND METHOD

FIELD OF INVENTION

The present invention relates to a peer highlight generation apparatus and method.

BACKGROUND

The popularity of online multi-player video games has increased in recent years. Such multi-player video games allow users to connect with other users while completing certain achievements or challenges within the video game. For example, in order to complete certain achievements or challenges within a multi-player video game, two or more users may need to co-operate with each other. For example, the two or more users may need to help each other in order to overcome a certain obstacle or defeat a mutual enemy. In other examples, completing certain achievements or challenges may require the two or more users to compete with each other. For example, the two or more users may be split into two or more teams, and the challenge is to obtain more points, kills, goals, etc. than the other team.

While playing an online multi-player video game, users may communicate with each other either to discuss strategies for completing a certain achievement or challenge, or for social interaction and camaraderie. Indeed, certain online multi-player video games even place an emphasis on social interaction and camaraderie between users.

Users wishing to continue social interactions with each other outside of the given gaming session (that is, in future gaming sessions and/or in non-gaming related contexts such as voice chats, video chats, and the like) may add each other to their own respective "friends lists".

Typically, a friends list provides the user thereof with information regarding the other users added thereto, such information including the other users' gaming profiles (which in turn typically include the other users' given names, usernames, completed in-game achievements, games played, and the like), which of the other users are currently "online" (that is, connected to the network that facilitates online multi-player video game sessions), and the like. Such friends lists also typically enable the user thereof to contact the other users added thereto (over instant messaging, Voice over Internet Protocol, videoconferencing, or the like).

Optionally, such friends lists may include so-called "friend suggestions". Such friend suggestions are typically invitations for the user to add suggested users to their friends lists. These suggested users may have recently played in an online multi-player video game with the user, and thus may have interacted with the user. Much like with the information provided about user added to the friends list, friend suggestions may comprise information such as the suggested user's gaming profile, online activity, and the like, and may also enable the user to contact the suggest user. If the user accepts the friend suggestion, the suggested user is added to their friends list.

However, when using commonly-known friends lists, an onus is placed on the user to recognise other users within the friends lists from their given name and/or username. As will be appreciated, such an onus may make using friends lists difficult, if not impossible, for people with memory issues or cognitive issues.

As a non-limiting example, such a user may find it hard to remember that a given username is associated with another user with whom the user frequently participates in video game sessions. Such difficulty in remembering may result in the user removing the other user from the friends list, therefore making it more difficult for the user to participate in future gaming sessions with the other user and/or contact the other user.

As another non-limiting example, a malicious user may attempt to use friend suggestions as a means to trick or defraud other users. This malicious user may do so by, say, entering video game sessions with other users, and thereby become the subject of a friend suggestion on the other users' friends lists. Other users (especially those with memory/cognitive issues), seeing the malicious user's friend suggestion, may consequently add the malicious user to their friends lists under the assumption that the malicious user is actually a gamer that shares similar gaming interests with (that is, plays similar games to) the other users, and thus may want to play with in future. Once the connection between such 'friends' has been established, the malicious user may then attempt to engage in unfriendly or fraudulent social interaction with the other users.

The present invention seeks to alleviate or mitigate this issue.

SUMMARY OF THE INVENTION

In a first aspect, a peer highlight generation apparatus is provided in claim 1.

In another aspect, a peer highlight generation method is provided in claim 13.

Further respective aspects and features of the invention are defined in the appended claims.

BRIEF DESCRIPTION OF THE DRAWINGS

Embodiments of the present invention will now be described by way of example with reference to the accompanying drawings, in which.

DESCRIPTION OF THE EMBODIMENTS

A peer highlight generation apparatus and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In an example embodiment of the present invention, an entertainment system is a non-limiting example of such a peer highlight generation apparatus.

Figure 1:
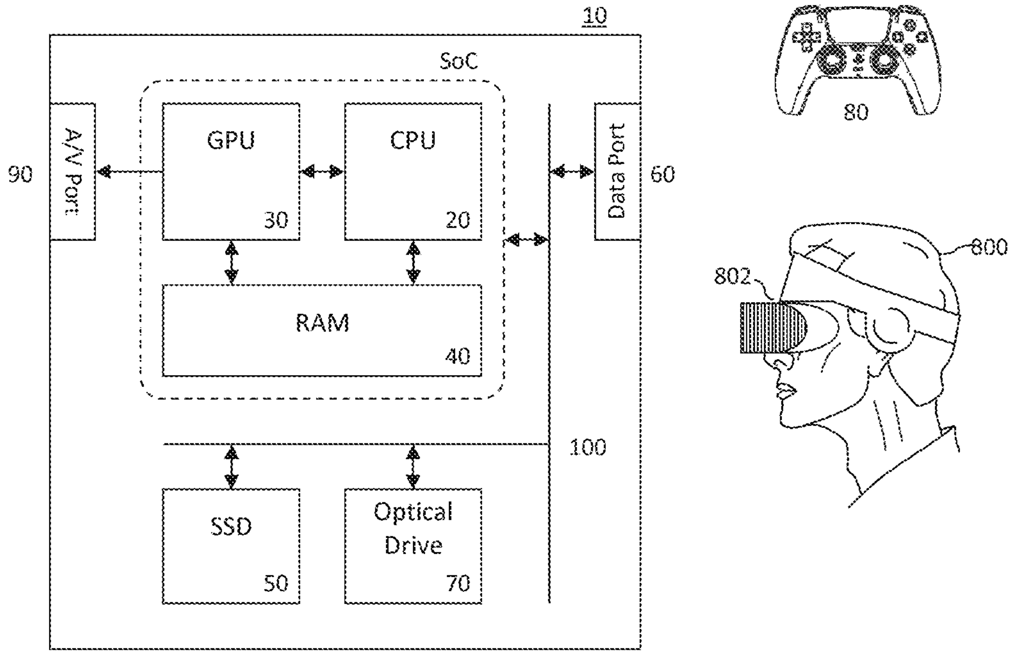
FIG. 1 schematically illustrates an entertainment system operable as a peer highlight generation apparatus according to embodiments of the present description.

Referring to FIG. 1, an example of an entertainment system 10 is a computer or console such as the Sony® PlayStation 5® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

An example of a device for displaying images output by the entertainment system is a head mounted display 'HMD' 802, worn by a user 800.

As mentioned previously, commonly-known friends lists place an onus on the user thereof to recognise peers from their given names and/or usernames. However, such an onus makes the use of friends lists difficult, if not impossible, and potentially even dangerous for users with memory issues and/or cognitive issues.

Therefore, there is a need in the art to make the use of friends lists more accessible and safer for users. The present invention seeks to fulfil this need by mitigating or alleviating the onus placed on users to recognise peers in friends lists.

The present invention comprises means to enable the user of a friends lists to view highlights of the peers (that is, peer highlights) in the friends lists. As will be appreciated by persons skilled in the art, the term "peer" here means both other users that have been added to the friends list by the user and suggested users (that is, users suggested to the user as part of a friend suggestion).

Such a peer highlight serves to assist the user in recognising who the peer in the friends list is; not only does the user have the given name/user name of the peer, but may also be provided with an image/video of the peer's avatar in, say, the most recent video game session in which both the user and peer participated together. The highlight may depict a significant/memorable action that the peer's avatar took within that most recent video game session. As a non-limiting example, a highlight where the peer's avatar uses a bazooka to kill an enemy at point-blank range but also dies due to the blast may be a particularly humorous/significant/memorable moment that the user may rely upon to recognise the peer.

The rendered peer highlights may thus enable users to make more informed decisions with regards to which of the other users should be added to/kept on/removed from their friends lists, thereby making the use of friends lists more accessible and safer for users thereof.

Peer Highlight Generation Apparatus

Figure 2:
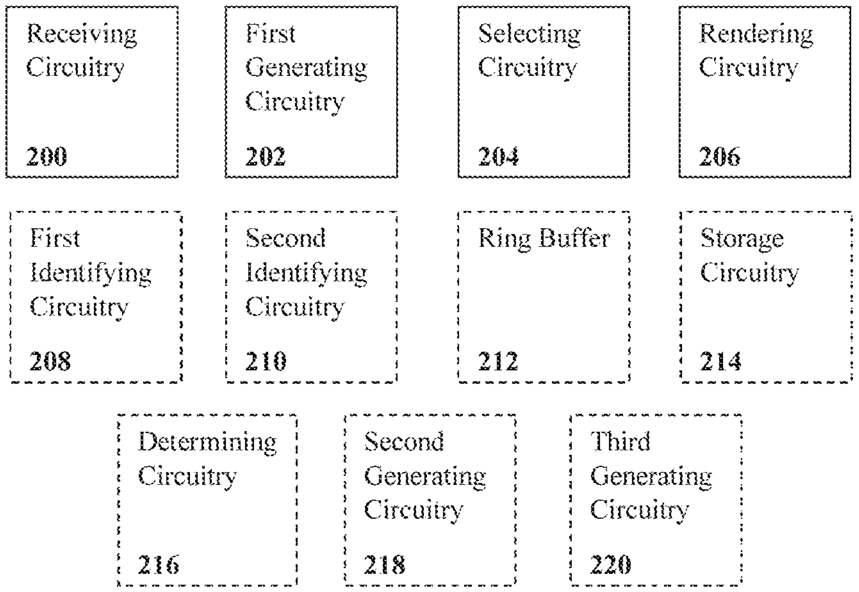
FIG. 2 schematically illustrates a peer highlight generation apparatus according to embodiments of the present description.

Accordingly, turning now to FIG. 2, in embodiments of the present description, a peer highlight generation apparatus comprises: receiving circuitry 200 configured to receive peer profile data associated with a user, wherein the peer profile data identifies one or more peer gaming profiles that are respectively associated with one or more peers, wherein each peer has participated with the user in one or more video game sessions; first generating circuitry 202 configured to generate one or more candidate highlights of a given peer, wherein each candidate highlight comprises image data of one of the one or more video game sessions in which the user and the given peer participated together, wherein at least a part of each candidate highlight comprises image data of an in-game avatar of the given peer; selecting circuitry 204 configured to select a highlight from among the one or more generated candidate highlights; and rendering circuitry 206 configured to render, for display, a list of one or more of the peer gaming profiles, wherein the list comprises the peer gaming profile of the given peer, wherein rendering circuitry 206 is configured to render the list in dependence upon at least part of the received peer profile data; wherein rendering circuitry 206 is configured to render, for display, the selected highlight as part of an entry of the list that comprises the peer gaming profile of the given peer.

As a non-limiting example of the peer highlight generation apparatus in use, consider a user navigating their friends list after having played one or more video game sessions with other users, the friends list currently being rendered for display by their video game console. Each peer's gaming profile appearing on the user's friends list is most likely another user with whom the user has participated together in one or more video game sessions prior to the user navigating their friends list. Before rendering of the friends lists for display to the user can occur, receiving circuitry 200 receives peer profile data that identifies the gaming profiles of these peers, this peer profile data being received from, say, the network that facilitates multi-player video game sessions (hereinafter referred to as a "gaming network") such as the Internet, PlayStation® Network™, LAN, WLAN, or the like. Such networks typically store participant data that identifies the gaming profiles of participants of past and present multi-player video game sessions for online harassment detection purposes, and so identifying which other users participated in a video game session together with the user may be achieved using such participant data, for example.

While the peer profile data helps to determine which gaming profiles should be rendered within the friends list, such peer profile data does not typically identify a highlight of each peer whose gaming profile is identified therein. In order to provide highlights of the peers (that is, peer highlights) and thus help users making more informed decisions as to the maintenance of their friends lists, first generating circuitry 202 may generate one or more candidate highlights of a given peer identified in the peer profile data. A candidate highlight may be thought of as an image/video clip of the given peer's avatar in a video game session in which the user and the given peer participated together.

As will be appreciated by persons skilled in the art, this candidate highlight generation may take place at the time of (that is, during) the video game session in question, or afterwards. Regarding the former, the peer profile data may identify a given peer with whom the user is participating together in an ongoing (current) video game session, and first generating circuitry 202 may subsequently generate candidate highlights of at least the given peer's avatar during gameplay in dependence upon on some of the gameplay data stored in, say, a ring buffer comprised within the video game console or comprised within the multi-player video game server, for example. Regarding the latter, the peer profile data may identify a given peer with whom the user participated together in a completed video game session, and first generating circuitry 202 may subsequently generate candidate highlights of at least the given peer's avatar in dependence upon some of the gameplay data stored in a storage memory such as an SSD or HDD comprised within the video game console or comprised within the video game server, for example.

Determining which parts of a given video game session in which the user and the given peer participate together should be used to generate candidate highlights may be based on, say, whether the given peer scored a goal, killed an enemy, set a fastest lap time, and the like. More comprehensive generation methods shall be discussed later herein.

Once one or more candidate highlights of the given peer's avatar have been generated, selecting circuitry 204 may select one of the candidate highlights as the highlight to be used in the friends list. This selection may be based on which of the candidate highlights is the most recent (that is, came from the most recent video game session in which the user and the given peer participated together), for example. More comprehensive selection methods shall be discussed later herein.

Subsequently, rendering circuitry 206 may render the selected highlight of the given peer's avatar as part of the given peer's entry on the friends list. This highlight may be rendered for the entire duration in which the friends list is being rendered for display, or may be rendered in response to a selection of the given peer's entry on the friends list by the user, the selection being carried out using a video game controller, mouse and keyboard, and the like.

As will be appreciated by persons skilled in the art, the rendered peer highlights may thus enable users to make more informed decisions with regards to which of the other users should be added to/kept on/removed from their friends lists, this being especially apparent when considering users that may have cognitive and/or memory issues. Such peer highlights therefore make the use of friends lists more accessible and safer for users thereof.

It will be appreciated that the peer highlight generation apparatus may comprise just a videogame console such as the PlayStation 5 or also comprise a server. To console itself may be virtual in the case of a cloud streaming service, and hence may also be on the server or on a companion server operating as the console. The peer profile data may be held by either the console or the server, and the receiving apparatus either receives it via a network such as the internet for from a local storage. The console typically records the game footage from which candidate highlights are generated, and may generate the candidates and store them locally or upload them to the server (for a server implementation this is typically more efficient than uploading footage to generate candidates at the server, but this is not excluded). The selection may again occur at the console or at the server, typically depending on where the candidate highlights are stored. The rendering is then typically on the console, whether local or in the cloud.

Peer Profile Data

In embodiments of the present description, receiving circuitry 200 is configured to receive peer profile data associated with a user, wherein the peer profile data identifies one or more peer gaming profiles that are respectively associated with one or more peers, wherein each peer has participated with the user in one or more video game sessions. In embodiments of the present description, receiving circuitry 200 may comprise one or more data ports 60, such as USB ports, Ethernet® ports, WiFi® ports, Bluetooth® ports, or the like. Alternatively or in addition, receiving circuitry 200 may comprise an I/O bus such as bus 100.

In short, peer profile data is used to identify which of the other users using the gaming network (the Internet, PlayStation® Network™, LAN, WLAN, or the like) has participated with the user in one or more (past and/or current) video game sessions. That is to say that the peer profile data is used to identify peers. As mentioned previously, the peer profile data may be received from the gaming network itself. This is because gaming networks typically store participant data (at a server, for example) that identifies the gaming profiles of participants of past and current multi-player video game sessions for online harassment detection purposes. As will be appreciated by persons skilled in the art, at least a part of this participant data may be transmitted as peer profile data to receiving circuitry 200 by the gaming network, this at least part of the participant data identifying one or more peers (that is, other users that participated together with the user in one or more video game sessions).

As will be appreciated by persons skilled in the art, the peer profile data may comprise the peer gaming profiles in question. Alternatively or in addition, the peer profile data may comprise pointers to memory addresses of a server comprised within the gaming network, the memory addresses corresponding to memory locations that respectively store one or more peer gaming profiles. Either or both of these situations should be construed by skilled persons as "peer profile data identifying one or more peer gaming profiles". For a given video game session in which the user is participating, the peer profile data (that identifies peers that are participating together with the user in the given video game session) may be received at receiving circuitry 200 while the given video game session is ongoing, or after the given video game session has ended. As such, updated peer profile data may be received at receiving circuitry 200 with each new video game session in which the user participates.

This updated peer profile data may identify one or more peer gaming profiles of "new" peers (hereinafter referred to as "new peer gaming profiles") which the user had not participated with in a video game session prior to the given video game session. Moreover, the updated peer profile data may or may not identify one or more peer gaming profiles of "old" peers (hereinafter referred to as "old peer gaming profiles") which the user had participated with in a video game session prior to the given video game session. In the former case, any previously received peer profile data identifying old peer gaming profiles may be stored in storage circuitry connected to/integral with the peer highlight generation apparatus, such as a HDD, SSD 50, ROM, or the like. In the latter case, the updated peer profile data may be utilised straight away by rendering circuitry 206, or may temporarily store the updated profile data in a cache, RAM 40, or the like, prior to utilisation by rendering circuitry 206.

In any case, once received at receiving circuitry 200, the peer profile data may be used to render the friends list for display to the user.

Candidate Highlights

In embodiments of the present description, first generating circuitry 202 is configured to generate one or more candidate highlights of a given peer, wherein each candidate highlight comprises image data of one of the one or more video game sessions in which the user and the given peer participated together, wherein at least a part of each candidate highlight comprises image data of an in-game avatar of the given peer. In embodiments of the present description, first generating circuitry 202 may be one or more CPUs (such as CPU 20), and/or one or more GPUs (such as GPU 30), for example.

In short, a given candidate highlight comprises image data of a given peer's avatar within a given video game session in which the user and the given peer participated together (hereinafter referred to as a "(given) shared video game session". As a non-limiting example, a given candidate highlight may be a video clip of the given peer's avatar using a bazooka to kill an enemy at point-blank range but also dying as a result of the blast.

The image data of a given candidate highlight may comprise one or more image frames. That is to say that the given candidate highlight may be a static image or a video clip comprising a plurality of image frames. Moreover, the point of view of a given candidate highlight may or may not coincide with that of the user, that of the given peer, or that of any other user; the only proviso regarding the point of view adopted is that the given peer's avatar is visible within at least a part of the given candidate highlight. Given this, it would be preferable to avoid using the point of view of the given peer if such a point of view is in a first person perspective, as otherwise the avatar of the given peer may not be sufficiently visible within the candidate highlight, thus increasing the difficulty with which the user may recognise the given peer's avatar.

Regarding the generation of candidate highlights of a given peer's avatar in a given shared video game session, first generating circuitry 202 may generate candidate highlights based on portions of the given shared video game session that satisfies a set of criteria. That is to say that criteria may be used to determine which parts of the given shared video game session would be suitable for generating peer highlights.

Hence more generally, embodiments of the present description may comprise first identifying circuitry 208 (which may be one or more CPUs 20, and/or one or more GPUs 30) configured to identify, for a given video game session in which the user and the given peer participated together, one or more portions of gameplay data of at least the given peer from the given video game session that satisfy one or more highlight generation criteria. Where embodiments comprise first identifying circuitry 208, first generating circuitry 202 may be configured to generate one or more of the candidate highlights in dependence upon the one or more identified portions of gameplay data.

Turning back to the bazooka example, a non-limiting example of a highlight generation criterion may take the form of a threshold volume that a given in-game sound must meet or exceed in order to trigger highlight generation using first generating circuitry 202. In this case, when the given peer fires the bazooka at point-blank range at the enemy, the volume of the bazooka blast may exceed the threshold volume, and first generating circuitry 202 may generate a candidate highlight of the given peer's avatar during the time of the bazooka blast in response thereto. As will be appreciated by persons skilled in the art, the moments leading up to the bazooka blast may be useful in aiding the user in recognising the given peer. Alternatively or in addition, the aftermath of the bazooka blast may be similarly useful. Thus, the candidate highlight may start a predetermined amount of time prior to the bazooka blast, and/or may end a predetermined amount of time after the bazooka blast. This shall be discussed in more detail later herein.

Regarding other highlight generation criteria, the one or more highlight generation criteria may comprise at least one of:

- whether the avatar of the given peer is taking part in an in-game event (the term "in-game event" should be taken to denote an event occurring within a given shared video game session in which the status of/score associated with the given peer's avatar changes; scoring a goal in a football match, killing an enemy, dying, changing place in a race, and the like, for example);
- whether the avatar of the given peer is within a threshold distance from an avatar of the user (the avatars of the given peer and user being located near each other in the candidate highlight may be useful in helping the user recognise the peer);
- whether the avatar of the given peer is visible from a viewpoint of a virtual camera associated with the user (such a criteria may lead to candidate highlights of the given peer from the point of view of the user, which may be useful in helping the user recognise the peer);
- whether a brightness or contrast of a part of a virtual environment in which the given video game session occurred meets or exceeds a threshold brightness or a threshold contrast (an explosion/blast in a shooting game, for example);
- whether a volume of an in-game sound within the given video game session meets or exceeds a threshold volume (the aforementioned bazooka blast in a shooting game, for example);
- whether a volume of a voice chat associated with the given video game session meets or exceeds a threshold volume, the voice chat comprising the user and the given peer (at a certain point in time during the given shared video game session, the voice chat participants may laugh/shout at an above-threshold volume, which may indicate that a memorable moment in the shared video game session is occurring); and
- whether the user and the given peer are engaged in a conversation with each other during the given video game session (this may be detected in a voice chat associated with the given shared video game session by determining the timings of each participants' speech within the voice chat; a conversation between the user and given peer within this voice chat may result in an alternation in the timings of the user's and given peer's speech, for example).

It should be noted that the preceding examples are not exhaustive; persons skilled in the art will appreciate that highlight generation criteria other than those mentioned previously are considered within the scope of the present description. Moreover, a given highlight generation criterion may be immutable or dynamically adjustable, and may have been predefined or user-defined.

Alternatively or in addition, embodiments of the present description may comprise second identifying circuitry 210 (which may be one or more CPUs 20, and/or one or more GPUs 30) configured to identify, for a given video game session in which the user and the given peer participated together, one or more player-generated highlights generated by at least one of the user and the given peer from the given video game session. Where embodiments comprise second identifying circuitry 210, first generating circuitry may be configured to generate one or more of the candidate highlights in dependence upon the one or more identified player-generated highlights.

That is to say that first generating circuitry 202 may generate candidate highlights based on player-generated highlights generated by the user or the given peer during the shared video game session. Such player-generated highlights are typically generated in response to a player (the user, given peer, or some other user participating in the shared video game session) pressing a dedicated button on a video game controller or a dedicated key on a keyboard, for example.

As a non-limiting example, the player-generated highlights may be used outright as one of the candidate highlights of the given peer's avatar. In this case, if the user or the given peer generates a player-generated highlight, and if at least a part of the player-generated highlight comprises the given peer's avatar, then that player-generated highlight may be used as one of the candidate highlights of the given peer.

In order to determine whether the given peer's avatar is present in at least a part of the player-generated highlight, first generating circuitry 202 may utilise metadata associated with the player-generated highlight, which may comprise a list of peers appearing in the player-generated highlight. Alternatively or in addition, first generating circuitry 202 may identify the given peer's avatar using computer vision techniques. For example, first generating circuitry 202 may generate static images of each peer's avatar within the shared video game session (as will be appreciated, these static images may themselves be used as a respective candidate highlight of each peer's avatar), each image comprising metadata indicating which peer is being represented by the respective avatar. First generating circuitry 202 may then evaluate the appearances of a given avatar in the player-generated highlight against the appearances of the avatars in the static images. Subsequently, first generating circuitry 202 may identify the given avatar as being a given peer's avatar by utilising the metadata associated with the static image comprising the avatar whose appearance bears the greatest resemble to that of the given avatar in the player-generated highlight.

Alternatively or in addition, second identifying circuitry 210 may be configured to identify a starting timestamp and an ending timestamp of a given player-generated highlight, and identify gameplay data of at least the given peer from the given video game session that occurred between the starting and ending timestamps of the player-generated highlight. In this case, first generating circuitry 202 may be configured to generate a given candidate highlight in dependence upon the identified gameplay data.

That is to say that the time information of a player-generated highlight generated during a given shared video game session (that is, the start and end times of the player-generated highlight with respect to the start of the given shared video game session) may be used to identify a portion of the given shared video game session that may be used to generate a candidate highlight of the given peer.

In this case, there is no need to detect whether the given peer is comprised within at least a part of the player-generated highlight, as the generated candidate highlight is generated from a point of view in which the given peer is at least partially visible, thereby ensuring that the given peer is visible within at least a part of the generated candidate highlight.

As a non-limiting example, consider a user and a given peer are playing a football match in a football video game together. At some point during the football match (that is, shared video game session), the user scores a goal. The user may wish to make a highlight of the goal they have scored, and so presses a dedicated button on their video game controller in order to trigger the generation of a player-generated highlight. Subsequently, the user's video game console may retrieve the most recent, say, 10 minutes of gameplay footage from a ring buffer comprised therein, and the user may edit this gameplay footage using a dedicated graphical user interface in order to create, say, a 30 second highlight of the user's goal.

Once the player-generated highlight has been generated, second identifying circuitry 210 may analyse the player-generated highlight in order to identify a starting timestamp and an ending timestamp, these timestamps indicating the start and end of the player-generated highlight with respect to the start of the football match, with respect to the start of the gameplay footage as stored in the ring buffer, or with respect to the start of the gameplay footage as stored in some other storage circuitry, such as SSD 50, a HDD, or the like. For example, second identifying circuitry 210 may identify that, with respect to the start of the gameplay footage as stored in the ring buffer, the player-generated highlight has a starting timestamp of, say, 7 minutes, and an ending timestamp of, say, 7 minutes 30 seconds.

Once the starting and ending timestamps have been identified, second identifying circuitry 210 may identify the portion of gameplay footage within the ring buffer that occurs between the timestamps, and identify a point of view in which the given peer's avatar is at least partially visible during the identified portion of gameplay. First generating circuitry 202 may subsequently generate a candidate highlight of given peer's avatar based on the identified portion of gameplay and the identified point of view. This candidate highlight may comprise image data of the given peer's avatar assisting the user's avatar with a so-called "through ball", that is, a pass of the football to the user's avatar that breaks through the opposing team's defensive line, enabling the user's avatar to take on the goalkeeper in a 1-on-1 and score the goal. Such an assist by the given peer's avatar may be useful in aiding the user in recognising the given peer.

For a given shared video game session, first generating circuitry 202 may generate one or more candidate highlights of at least the given peer's avatar while the given video game session is ongoing. As will be appreciated by persons skilled in the art, the above example regarding the football match demonstrates a non-limiting example of such an on-the-fly approach to highlight generation; the gameplay footage stored in the ring buffer may be utilised for highlight generation purposes while the football match is ongoing. As will be appreciated by persons skilled in the art, this on-the-fly approach may be adopted regardless of whether first identifying circuitry 208 or second identifying circuitry 210 is implemented in embodiments of the present description, or whether some other form of highlight generation is adopted (such as generating a candidate highlight of the given peer periodically, for example).

Hence more generally, embodiments of the present description may comprise ring buffer 212, which may be configured to store, for a given video game session in which the user and the given peer participated together, a most recent portion of gameplay data of at least one of the user and the given peer while the given video game session is ongoing. Where embodiments comprise ring buffer 212, first generating circuitry 202 may be configured to generate one or more of the candidate highlights while the given video game session is ongoing in dependence upon the most recent portion of gameplay data stored at ring buffer 212.

Alternatively or in addition, for a given shared video game session, first generating circuitry 202 may generate one or more candidate highlights of at least the given peer's avatar after the given video game session has ended. This may be achieved by firstly storing gameplay data of the given shared video game session in some storage circuitry, such as SSD 50, a HDD, or the like.

Turning back to the football match example, the storage circuitry of the user's video game console may have stored gameplay footage of the football match. This stored gameplay footage may be accessed by first generating circuitry 202 after the football match has ended, and one or more candidate highlights may be generated therefrom using any of the techniques discussed hereinbefore.

Hence more generally, storage circuitry 214 may be configured to store, for a given video game session in which the user and the given peer participated together, gameplay data of at least one of the user and the given peer from the given video game session. Where embodiments comprise storage circuitry 214, first generating circuitry 202 may be configured to generate one or more of the candidate highlights after the given video game session has ended in dependence upon the gameplay data stored at storage circuitry 214.

While this discussion has mainly focused on gameplay footage (that is, the rendered image data of at least a part of the shared video game session), other types of gameplay data may be utilised for candidate highlight generation (regardless of whether an on-the-fly approach is taken, or a retrospective approach is taken).

As a non-limiting example, telemetry data of at least the given peer from the shared video game session may be utilised for candidate highlight generation. As will be appreciated by persons skilled in the art, such telemetry data typically comprises data regarding the inputs and actions a given player provides to the shared video game session via their video game controller, mouse and keyboard, or the like. Such telemetry data may be stored in the gaming network, or the user's and/or given peer's respective video game consoles/computers.

In order to generate a candidate highlight using this telemetry data, first generating circuitry 202 may render a copy of the video game's virtual environment (a football pitch, for example), and render an avatar therein. First generating circuitry 202 may use the given peer's telemetry data to control the actions of the avatar within the virtual environment, and generate candidate highlights of the rendered avatar's actions within the virtual environment. As will be appreciated by persons skilled in the art, in order to help the user recognise that this avatar represents the given peer, the avatar may be rendered such that it resembles the appearance of the given peer's avatar within the shared video game session. Moreover, more than one avatar may be rendered, and each of the avatars may be controlled using telemetry data of a respective participant within the shared video game session.

In any case, first generating circuitry 202 may generate metadata for a given candidate highlight (either before, while or after the generation of the given generated candidate highlight), such metadata may indicate, say, the username or given name of the given peer who controlled the avatar depicted in at least a part of the given candidate highlight. Such metadata may be useful for ensuring that the given candidate highlight, if selected by selecting circuitry 204 as the highlight to be used in the user's friends list, is rendered as part of the given peer's entry on the friends list (as opposed to being rendered in some other user's entry thereon).

In any case, once one or more candidate highlights of the given peer have been generated, one of these candidate highlights may be selected as the highlight that is to be rendered for display to the user when the user is navigating their friends list.

Highlight Selection

In embodiments of the present description, selecting circuitry 204 is configured to select a highlight from among the one or more generated candidate highlights. In embodiments of the present description, selecting circuitry 204 may be one or more CPUs (such as CPU 20), and/or one or more GPUs (such as GPU 30), for example.

As mentioned previously, the selection carried out by selecting circuitry 204 may be based on which of the candidate highlights is the most recent (that is, came from the most recent video game session in which the user and the given peer participated together), for example. However, doing so may result in a highlight being selected that is not likely to aid the user in recognising the given peer. For example, selecting the most recent candidate highlight as the highlight to be rendered in the friends list may result in the selection of a candidate highlight in which the given peer's avatar is not doing anything particularly memorable (standing still while the given peer is away from their video game console, for example).

As such, it may be advantageous to adopt a more comprehensive selection approach when selecting highlights, that is, an approach that considers factors other than how recent the candidate highlight is.

More generally, embodiments of the present description may comprise determining circuitry 216 208 (which may be one or more CPUs 20, and/or one or more GPUs 30) configured to determine, in dependence upon one or more ranking factors, a total priority score for each generated candidate highlight, wherein, for a given ranking factor, determining circuitry 216 is configured to rank the generated candidate highlights in accordance with the given ranking factor, and determine, in dependence upon the ranking of the generated candidate highlights, a priority score for each generated candidate highlight, wherein the total priority score for a given generated candidate highlight comprises a combination of the priority scores determined for the given generated candidate highlight in accordance with the one or more ranking factors. Where embodiments comprise determining circuitry 216, selecting circuitry 204 may be configured to select, as the highlight, the generated candidate highlight whose total priority score is the largest from among the one or more generated candidate highlights.

As a non-limiting example of determining circuitry 216 in operation, consider a plurality of candidate highlights of a given peer, where one of those candidate highlights comprises the aforementioned bazooka kill. This bazooka kill candidate highlight may be the candidate highlight that is most likely to help the user in recognising the given peer, as the candidate highlight may comprise loud sounds (the bazooka blast), a killing of the enemy, the given peer's avatar's own death, and a loud voice chat volume (loud laughing/shouting at the humorous moment). As will be appreciated by persons skilled in the art, such factors may be utilised by selecting circuitry 204 in order to select the bazooka kill candidate highlight as the highlight to be rendered in the friends list.

For example, a first ranking factor may be the volume of in-game sounds within a given candidate highlight. This volume may be, say, a time-averaged volume, a maximum volume, or the like. The bazooka kill candidate highlight may be ranked as the loudest candidate highlight due to the bazooka blast, and so determining circuitry 216 may determine that the bazooka kill candidate highlight is to be given the largest priority score in associated with the first ranking factor. A second ranking factor may be the number of kills and/or deaths within a given candidate highlight. In this case, the bazooka kill candidate highlight may be ranked lower down than when ranked in accordance with in-game sound volume, as at least one of the other candidate highlights may comprise more kills and/or deaths than the bazooka kill candidate highlight, and so determining circuitry 216 may determine that the bazooka kill candidate highlight is to be given a priority score in associated with the second ranking factor that is lower than that associated with the first ranking factor. A third ranking factor may be the volume of a voice chat associated with a given candidate highlight. Again, this volume may be, say, a time-averaged volume, a maximum volume, or the like. The bazooka kill candidate highlight may be ranked as the loudest candidate highlight due to the loud laughter/shouting in the associated voice chat, and so determining circuitry 216 may determine that the bazooka kill candidate highlight is to be given the largest priority score in associated with the third ranking factor.

The three priority scores given to the bazooka kill candidate highlight may be combined by determining circuitry 216 in order to determine a total priority score. These priority scores may be combined in various ways, including summing, multiplying, (weighted) averaging, or the like. Once the total priority scores have been determined, selecting circuitry 204 may subsequently select the bazooka kill candidate highlight as the highlight to be rendered in the friends list, as this candidate highlight may have the greatest total priority score, not least because of the priority scores associated with the first and third ranking factors.

While the above example discusses the use of multiple ranking factors, only one ranking factor may be used. If one ranking factor is to be used, it may be advantageous to use a ranking factor that considers the content of the candidate highlights, rather than, say, how recent the candidate highlight is.

In any case, the one or more ranking factors comprise at least one of: (i) how recent the candidate highlight that was generated from a given video game session in which the user and the given peer participated together is; (ii) a proportion of peer occupancy within the candidate highlight that was generated from a given video game session in which the user and the given peer participated together, the proportion of peer occupancy being the proportion of the candidate highlight occupied by the avatar of the given peer (a percentage of a given image frame that the given peer's avatar occupies, a ratio of image frames in which the given peer's is at least partially visible to total number of image frames within the candidate highlight, for example); (iii) a brightness or contrast of the candidate highlight that was generated from a given video game session in which the user and the given peer participated together (the visual intensity of explosions/blasts within the candidate highlight, for example); (iv) a volume of in-game sounds in the candidate highlight that was generated from a given video game session in which the user and the given peer participated together (the aural intensity of explosions/blasts within the candidate highlight, for example); (v) a volume of a voice chat associated with the candidate highlight that was generated from a given video game session in which the user and the given peer participated together; and (vi) a significance of an in-game event depicted in the candidate highlight that was generated from a given video game session in which the user and the given peer participated together (how many kills and/or deaths, how late the winning goal was scored in the football match, how many other racers were overtaken on a bend in the track, for example).

It should be noted that the preceding examples are not exhaustive; persons skilled in the art will appreciate that highlight generation criteria other than those mentioned previously are considered within the scope of the present description.

In order to ensure that only the candidate highlights of the given peer are being ranked, metadata associated with the candidate highlights may be utilised by determining circuitry 216 to determine which peer is being represented by the avatar in a given candidate highlight, and may subsequently include or discount the given candidate highlight in/from the ranking in dependence upon this peer determination. As mentioned previously, this metadata may be generated by first generating circuitry 202.

In any case, once selecting circuitry 204 selects a highlight of the given peer from among the candidate highlights, the selected highlight may be rendered as part of the given peer's entry on user's friends list to assist the user in recognising the given peer.

Friends List Rendering

In embodiments of the present description, rendering circuitry 206 is configured to render, for display, a list of one or more of the peer gaming profiles (that is, a friends list), wherein the list comprises the peer gaming profile of the given peer, wherein rendering circuitry 206 is configured to render the list in dependence upon at least part of the received peer profile data; wherein rendering circuitry 206 is configured to render, for display, the selected highlight as part of an entry of the list that comprises the peer gaming profile of the given peer. In embodiments of the present description, may be one or more CPUs (such as CPU 20), and/or one or more GPUs (such as GPU 30), for example.

As mentioned previously, rendering circuitry 206 may render the selected highlight for the entire duration in which the friends list is being rendered for display. This, however, may significantly increase the amount of computational resources utilised to render the friends list.

Alternatively, rendering circuitry 206 may render the selected highlight in response to a selection of the given peer's entry on the friends list by the user, the selection being carried out using a video game controller, mouse and keyboard, or the like. Doing so may reduce the increase in computational resource expenditure associated with rendering the friends list while still also assisting the user in recognising the given peer. Hence more generally, rendering circuitry 206 may be configured to render, for display, the selected highlight as part of the entry of the list in response to a selection of the entry of the list by the user.

In order to ensure that the selected highlight is rendered as part of the given peer's entry on the friends list, metadata associated with the selected highlight may be utilised by rendering circuitry 206 to determine which peer is being represented by the avatar in the selected highlight, and may subsequently render the selected highlight as part of the given peer's entry if the avatar is found to represent the given peer. As mentioned previously, this metadata may be generated by first generating circuitry 202.

In order to further help the user in recognising the given peer, it may be advantageous to provide the user with a summary of the user's and given peer's shared gaming history. Such a summary may be based on at least a part of the shared video game session from which the selected highlight was generated, for example. The summary may comprise a general overview of the shared video game session ("the team that you and peer 1 were a part of won this team deathmatch", for example), or may comprise an overview of a particular moment in the shared video game session ("you overtook peer 1 when peer 1 crashed at a chicane", for example). The particular moment in question may or may not be that depicted in the selected highlight; the summary may be based on one of the candidate highlights of the given peer that was not selected by selecting circuitry 204, as a non-limiting example.

More generally, embodiments of the present description may comprise second generating circuitry 218 (which may be one or more CPUs 20, and/or one or more GPUs 30) configured to generate a game summary of at least a part of the video game session in which the user and the given peer participated together from which the selected highlight was generated, wherein second generating circuitry 218 may be configured to do so in dependence upon gameplay data of at least the given peer from the video game session. Where embodiments comprise second generating circuitry 218, rendering circuitry 206 may be configured to render, for display, the game summary as part of the entry of the list that comprises the peer gaming profile of the given peer.

As a non-limiting example, second generating circuitry 218 may generate the game summary by using computer vision techniques. For example, second generating circuitry 218 may use such techniques to detect (actions of) avatars, objects, scenery, and the like depicted within a part of gameplay footage that may be stored in a ring buffer or storage circuitry of the user's video game console, or within a part of gameplay footage depicted in the selected highlight or a candidate highlight that was not selected by selecting circuitry 214, for example.

Alternatively or in addition, second generating circuitry 218 may rely on gameplay data other than that of gameplay footage (that is, image data). For example, the telemetry data of at least the given peer may be utilised, as such telemetry data may be a more accurate source of information regarding the actions taken by the given peer's avatar during the shared video game session. As mentioned previously, this telemetry data may be received from the gaming network hosting the shared video game session. Moreover, the telemetry data in question may correspond to the gameplay depicted in the selected highlight, a candidate highlight that was not selected by selecting circuitry 214, or some other moment within the shared video game session.

In any case, once the game summary is generated by second generating circuitry 218, rendering circuitry 206 may render this summary as part of the given peer's entry on the friends list. Rendering circuitry 206 may render this summary visually (as text, for example) and/or aurally (as spoken words, for example). Moreover, rendering circuitry 206 may render the game summary for the entire duration in which the friends list is being rendered for display, or may be rendered in response to a selection of the given peer's entry on the friends list by the user in order to reduce the increase in computational expenditure associated with rendering the friends list.

Alternatively or in addition, a summary of the user's and given peer's gaming history beyond that of the shared video game session from which the selected highlight was generated may be provided to the user in order to help them recognise the given peer. This summary may comprise a general overview of the number of video game sessions in which the user and given peer have participated together (that is, the number of shared video game sessions), the number of shared video game sessions that the user and/or peer won (the user and given peer may be teammates in one or more of the shared video game sessions and enemies in one or more of the shared video game sessions, for example), the total number goals/assists/kills/deaths respectively associated with the user and given peer throughout the shared video game sessions, and the like.

More generally, embodiments of the present description may comprise third generating circuitry 220 (which may be one or more CPUs 20, and/or one or more GPUs 30) configured to generate, in dependence upon historical gameplay data of the user and the given peer, a peer summary of the given peer. Where embodiments comprise third generating circuitry 220, rendering circuitry 206 may be configured to render, for display, the peer summary as part of the entry of the list that comprises the peer gaming profile of the given peer.

As will be appreciated by persons skilled in the art, the discussion vis-à-vis second generating circuitry 218 may be applied, mutatis mutandis, to third generating circuitry 220; the techniques used to generate the summary may be similar in both cases, yet the historical scope of the peer summary generated by third generating circuitry 220 may be thought of as generally being larger than that of the game summary generated by second generating circuitry 218.

In any case, rendering circuitry 206 may render the selected highlight as part of the given peer's entry on the friends list, and thereby enable the user of the friends list to make more informed decisions with regards to which of the other users should be added to/kept on/removed from their friends lists. That is to say that rendering the selected highlight in such a manner seeks to make the use of friends lists more accessible and safer for users thereof.

Peer Highlight Generation Method

Figure 3:
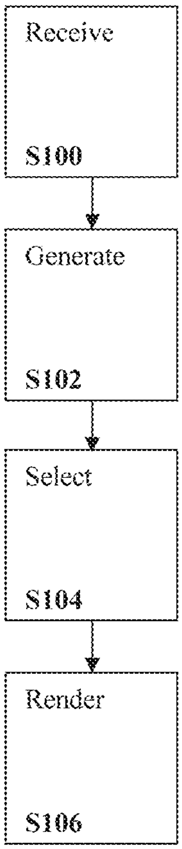
FIG. 3 schematically illustrates a peer highlight generation method according to embodiments of the present description.

Turning now to FIG. 3, a peer highlight generation method comprises the following steps:

S100: receiving peer profile data associated with a user, wherein the peer profile data identifies one or more peer gaming profiles that are respectively associated with one or more peers, wherein each peer has participated with the user in one or more video game sessions, as described elsewhere herein.

S102: generating one or more candidate highlights of a given peer, wherein each candidate highlight comprises image data of one of the one or more video game sessions in which the user and the given peer participated together, wherein at least a part of each candidate highlight comprises image data of an in-game avatar of the given peer, as described elsewhere herein.

S104: selecting a highlight from among the one or more generated candidate highlights, as described elsewhere herein.

S106: rendering, for display, a list of one or more of the peer gaming profiles, wherein the list comprises the peer gaming profile of the given peer, wherein the rendering circuitry is configured to render the list in dependence upon at least part of the received peer profile data; wherein rendering step S106 comprises rendering, for display, the selected highlight as part of an entry of the list that comprises the peer gaming profile of the given peer, as described elsewhere herein.

It will be apparent to a person skilled in the art that variations in the above method corresponding to operation of the various embodiments of the apparatus as described and claimed herein are considered within the scope of the present invention.

It will be appreciated that the above methods may be carried out on conventional hardware (such as entertainment device 10) suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. A peer highlight generation apparatus, comprising: receiving circuitry configured to receive peer profile data associated with a user, wherein the peer profile data identifies one or more peer gaming profiles that are respectively associated with one or more peers, wherein each peer has participated with the user in one or more video game sessions; first generating circuitry configured to generate one or more candidate highlights of a given peer, wherein each candidate highlight comprises image data of one of the one or more video game sessions in which the user and the given peer participated together, wherein at least a part of each candidate highlight comprises image data of an in-game avatar of the given peer; selecting circuitry configured to select a highlight from among the one or more generated candidate highlights; and rendering circuitry configured to render, for display, a list of one or more of the peer gaming profiles, wherein the list comprises the peer gaming profile of the given peer, wherein the rendering circuitry is configured to render the list in dependence upon at least part of the received peer profile data; wherein the rendering circuitry is configured to render, for display, the selected highlight as part of an entry of the list that comprises the peer gaming profile of the given peer.
2. A peer highlight generation apparatus according to clause 1, wherein the rendering circuitry is configured to render, for display, the selected highlight as part of the entry of the list in response to a selection of the entry of the list by the user.
3. A peer highlight generation apparatus according to any preceding clause, comprising: first identifying circuitry configured to identify, for a given video game session in which the user and the given peer participated together, one or more portions of gameplay data of at least the given peer from the given video game session that satisfy one or more highlight generation criteria; wherein the first generating circuitry is configured to generate one or more of the candidate highlights in dependence upon the one or more identified portions of gameplay data.
4. A peer highlight generation apparatus according to clause 3, wherein the one or more highlight generation criteria comprise at least one of: (i) whether the avatar of the given peer is taking part in an in-game event; (ii) whether the avatar of the given peer is within a threshold distance from an avatar of the user; (iii) whether the avatar of the given peer is visible from a viewpoint of a virtual camera associated with the user; (iv) whether a brightness or contrast of a part of a virtual environment in which the given video game session occurred meets or exceeds a threshold brightness or a threshold contrast; (v) whether a volume of an in-game sound within the given video game session meets or exceeds a threshold volume; (vi) whether a volume of a voice chat associated with the given video game session meets or exceeds a threshold volume, the voice chat comprising the user and the given peer; and (vii) whether the user and the given peer are engaged in a conversation with each other during the given video game session.
5. A peer highlight generation apparatus according to any preceding clause, comprising: second identifying circuitry configured to identify, for a given video game session in which the user and the given peer participated together, one or more player-generated highlights generated by at least one of the user and the given peer from the given video game session; wherein the first generating circuitry is configured to generate one or more of the candidate highlights in dependence upon the one or more identified player-generated highlights.
6. A peer highlight generation apparatus according to clause 5, wherein the second identifying circuitry is configured to identify a starting timestamp and an ending timestamp of a given player-generated highlight, and identify gameplay data of at least the given peer from the given video game session that occurred between the starting and ending timestamps of the player-generated highlight; wherein the first generating circuitry is configured to generate a given candidate highlight in dependence upon the identified gameplay data.
7. A peer highlight generation apparatus according to any preceding clause, comprising: a ring buffer configured to store, for a given video game session in which the user and the given peer participated together, a most recent portion of gameplay data of at least one of the user and the given peer while the given video game session is ongoing; wherein the first generating circuitry is configured to generate one or more of the candidate highlights while the given video game session is ongoing in dependence upon the most recent portion of gameplay data stored at the ring buffer.
8. A peer highlight generation apparatus according to any preceding clause, comprising: storage circuitry configured to store, for a given video game session in which the user and the given peer participated together, gameplay data of at least one of the user and the given peer from the given video game session; wherein the first generating circuitry is configured to generate one or more of the candidate highlights after the given video game session has ended in dependence upon the gameplay data stored at the storage circuitry.
9. A peer highlight generation apparatus according to any preceding clause, comprising: determining circuitry configured to determine, in dependence upon one or more ranking factors, a total priority score for each generated candidate highlight, wherein, for a given ranking factor, the determining circuitry is configured to rank the generated candidate highlights in accordance with the given ranking factor, and determine, in dependence upon the ranking of the generated candidate highlights, a priority score for each generated candidate highlight, wherein the total priority score for a given generated candidate highlight comprises a combination of the priority scores determined for the given generated candidate highlight in accordance with the one or more ranking factors; wherein the selecting circuitry is configured to select, as the highlight, the generated candidate highlight whose total priority score is the largest from among the one or more generated candidate highlights.

10. A peer highlight generation apparatus according to clause 9, wherein the one or more ranking factors comprise at least one of: (i) how recent the candidate highlight that was generated from a given video game session in which the user and the given peer participated together is; (ii) a proportion of peer occupancy within the candidate highlight that was generated from a given video game session in which the user and the given peer participated together, the proportion of peer occupancy being the proportion of the candidate highlight occupied by the avatar of the given peer; (iii) a brightness or contrast of the candidate highlight that was generated from a given video game session in which the user and the given peer participated together; (iv) a volume of in-game sounds in the candidate highlight that was generated from a given video game session in which the user and the given peer participated together; (v) a volume of a voice chat associated with the candidate highlight that was generated from a given video game session in which the user and the given peer participated together; and (vi) a significance of an in-game event depicted in the candidate highlight that was generated from a given video game session in which the user and the given peer participated together.

11. A peer highlight generation apparatus according to any preceding clause, comprising: second generating circuitry configured to generate a game summary of at least a part of the video game session in which the user and the given peer participated together from which the selected highlight was generated, wherein the second generating circuitry is configured to do so in dependence upon gameplay data of at least the given peer from the video game session; wherein the rendering circuitry is configured to render, for display, the game summary as part of the entry of the list that comprises the peer gaming profile of the given peer.

12. A peer highlight generation apparatus according to any preceding clause, comprising: third generating circuitry configured to generate, in dependence upon historical gameplay data of the user and the given peer, a peer summary of the given peer; wherein the rendering circuitry is configured to render, for display, the peer summary as part of the entry of the list that comprises the peer gaming profile of the given peer.

13. A peer highlight generation method, comprising the steps of: receiving peer profile data associated with a user, wherein the peer profile data identifies one or more peer gaming profiles that are respectively associated with one or more peers, wherein each peer has participated with the user in one or more video game sessions; generating one or more candidate highlights of a given peer, wherein each candidate highlight comprises image data of one of the one or more video game sessions in which the user and the given peer participated together, wherein at least a part of each candidate highlight comprises image data of an in-game avatar of the given peer; selecting a highlight from among the one or more generated candidate highlights; and rendering, for display, a list of one or more of the peer gaming profiles, wherein the list comprises the peer gaming profile of the given peer, wherein the rendering circuitry is configured to render the list in dependence upon at least part of the received peer profile data; wherein the rendering step comprises rendering, for display, the selected highlight as part of an entry of the list that comprises the peer gaming profile of the given peer.

14. A computer program comprising computer executable instructions adapted to cause a computer system to perform the method of clause 13.

15. A non-transitory, computer-readable storage medium having stored thereon the computer program of clause 14.

The invention claimed is:

1. An apparatus, comprising:

a non-transitory computer-readable medium storing processor executable instructions; and a processor communicatively coupled to the non-transitory computer-readable medium, the processor configured to execute the processor executable instructions to:

receive peer profile data associated with a user, wherein the peer profile data identifies one or more peer gaming profiles that are respectively associated with one or more peers, wherein each peer of the one or more peers has previously participated with the user in one or more video game sessions;

a plurality of candidate highlights of a given peer of the one or more peers, wherein each candidate highlight of the plurality of candidate highlights comprises image data of one of the one or more video game sessions in which the user and the given peer participated together, wherein at least a part of each candidate highlight of the plurality of candidate highlights comprises image data of an in-game avatar of the given peer;

determine, based on one or more ranking factors, a total priority score for each generated candidate highlight of the plurality of candidate highlights, wherein the total priority score is determined by ranking each generated candidate highlight of the plurality of candidate highlights in accordance with each ranking factor of the one or more ranking factors and determining a priority score for each generated candidate highlight of the plurality of candidate highlights based on the ranking, wherein the total priority score comprises a combination of the priority scores;

select, as a selected highlight, a generated candidate highlight whose total priority score is a largest from among the plurality of candidate highlights; and render, for display, a list of one or more of the peer gaming profiles based on the peer profile data, wherein the list comprises the peer gaming profile of the given peer of the one or more peers and the selected highlight.

2. The apparatus of claim 1, wherein the processor is further configured to execute the instructions to render, for display, the selected highlight as part of an entry of the list in response to a selection of the entry of the list by the user.

3. The apparatus of claim 1, wherein the processor is further configured to execute the instructions to:

identify, for a given video game session in which the user and the given peer participated together, one or more portions of gameplay data of at least the given peer from the given video game session that satisfy one or more highlight generation criteria; and generate one or more of the plurality of candidate highlights in dependence upon the one or more identified portions of gameplay data.

4. The apparatus of claim 3, wherein the one or more highlight generation criteria comprise at least one of:

i. whether the in-game avatar of the given peer is taking part in an in-game event;

ii. whether the in-game avatar of the given peer is within a threshold distance from an avatar of the user;

iii. whether the in-game avatar of the given peer is visible from a viewpoint of a virtual camera associated with the user;

iv. whether a brightness or contrast of a part of a virtual environment in which the given video game session occurred meets or exceeds a threshold brightness or a threshold contrast;

v. whether a volume of an in-game sound within the given video game session meets or exceeds a threshold volume;

vi. whether a volume of a voice chat associated with the given video game session meets or exceeds a threshold volume, the voice chat comprising the user and the given peer; and vii. whether the user and the given peer are engaged in a conversation with each other during the given video game session.

5. The apparatus of claim 1, wherein the processor is further configured to execute the instructions to;

identify, for a given video game session in which the user and the given peer participated together, one or more player-generated highlights generated by at least one of the user and the given peer from the given video game session; and generate one or more of the plurality of candidate highlights in dependence upon the one or more player-generated highlights.

6. The apparatus of claim 5, wherein the processor is further configured to execute the instructions to;

identify a starting timestamp and an ending timestamp of a given player-generated highlight;

identify gameplay data of at least the given peer from the given video game session that occurred between the starting timestamp and the ending timestamp of the given player-generated highlight; and generate a given candidate highlight in dependence upon the gameplay data.

7. The apparatus of claim 1, further comprising:

a ring buffer configured to store, for a given video game session in which the user and the given peer participated together, a most recent portion of gameplay data of at least one of the user and the given peer while the given video game session is ongoing, wherein the processor is further configured to generate one or more of the plurality of candidate highlights while the given video game session is ongoing in dependence upon the most recent portion of gameplay data stored at the ring buffer.

8. The apparatus of claim 1, wherein the processor is further configured to execute the instructions to:

store, for a given video game session in which the user and the given peer participated together, gameplay data of at least one of the user and the given peer from the given video game session; and generate one or more of the plurality of candidate highlights after the given video game session has ended in dependence upon the gameplay data.

9. The apparatus of claim 1, wherein the one or more ranking factors comprise at least one of:

i. how recent the candidate highlight that was generated from a given video game session in which the user and the given peer participated together is;

ii. a proportion of peer occupancy within the candidate highlight that was generated from a given video game session in which the user and the given peer participated together, the proportion of peer occupancy being a proportion of the candidate highlight occupied by the in-game avatar of the given peer;

iii. a brightness or contrast of the candidate highlight that was generated from a given video game session in which the user and the given peer participated together;

iv. a volume of in-game sounds in the candidate highlight that was generated from a given video game session in which the user and the given peer participated together;

v. a volume of a voice chat associated with the candidate highlight that was generated from a given video game session in which the user and the given peer participated together; and vi. a significance of an in-game event depicted in the candidate highlight that was generated from a given video game session in which the user and the given peer participated together.

10. The apparatus of claim 1, comprising: wherein the processor is further configured to execute the instructions to;

generate a game summary of at least a part of a video game session of the one or more video game sessions in which the user and the given peer participated together from which the selected highlight was generated, wherein the the game summary is generated in dependence upon gameplay data of at least the given peer from the video game session; and render, for display, the game summary as part of an entry of the list that comprises the peer gaming profile of the given peer.

11. The apparatus of claim 1, wherein the processor is further configured to execute the instructions to:

generate, in dependence upon historical gameplay data of the user and the given peer, a peer summary of the given peer; and render, for display, the peer summary as part of an entry of the list that comprises the peer gaming profile of the given peer.

12. The apparatus of claim 1, wherein the list of one or more of the peer gaming profiles is rendered after the user has participated in the one or more video game sessions, and wherein the list comprises a plurality of selected highlights, including the selected highlight, wherein each selected highlights of the plurality of selected highlights are associated with an individual peer gaming profile of the one or more peer gaming profiles.

13. The apparatus of claim 1, wherein the plurality of candidate highlights comprises a first candidate highlight, wherein generating the first candidate highlight comprises:

identifying an in-game event having an in game volume meeting or exceeding a threshold volume;

determining a start time of the in-game event beginning a predetermined amount of time prior to the in-game event;

determining an end time of the in-game event ending another predetermined amount of time after completion of the in-game event; and generating the first candidate highlight by recording the in-game event from the start time to the end time.

14. A method comprising:

receiving peer profile data associated with a user, wherein the peer profile data identifies one or more peer gaming profiles that are respectively associated with one or more peers, wherein each peer of the one or more peers has previously participated with the user in one or more video game sessions;

generating a plurality of candidate highlights of a given peer of the one or more peers, wherein each candidate highlight of the plurality of candidate highlights comprises image data of one of the one or more video game sessions in which the user and the given peer participated together, wherein at least a part of each candidate highlight of the plurality of candidate highlights comprises image data of an in-game avatar of the given peer;

determining, based on one or more ranking factors, a total priority score for each generated candidate highlight of the plurality of candidate highlights, wherein the total priority score is determined by ranking each generated candidate highlight of the plurality of candidate highlights in accordance with each ranking factor of the one or more ranking factors and determining a priority score for each generated candidate highlight of the plurality of candidate highlights based on the ranking, wherein the total priority score comprises a combination of the priority scores;

selecting, as a selected highlight, a generated candidate highlight whose total priority score is a largest from among the plurality of candidate highlights; and rendering, for display, a list of one or more of the peer gaming profiles based on the peer profile data, wherein the list comprises the peer gaming profile of the given peer of the one or more peers and the selected highlight.

15. The method of claim 14, wherein the list of one or more of the peer gaming profiles is rendered after the user has participated in the one or more video game sessions, and wherein the list comprises a plurality of selected highlights, including the selected highlight, wherein each selected highlights of the plurality of selected highlights are associated with an individual peer gaming profile of the one or more peer gaming profiles.

16. The method of claim 14, wherein the plurality of candidate highlights comprises a first candidate highlight, wherein generating the first candidate highlight comprises:

identifying an in-game event having an in game volume meeting or exceeding a threshold volume;

determining a start time of the in-game event beginning a predetermined amount of time prior to the in-game event;

determining an end time of the in-game event ending another predetermined amount of time after completion of the in-game event; and generating the first candidate highlight by recording the in-game event from the start time to the end time.

17. A non-transitory machine-readable storage medium which stores processor executable instructions which, when executed by a a processor, causes the processor to perform a method comprising:

receiving peer profile data associated with a user, wherein the peer profile data identifies one or more peer gaming profiles that are respectively associated with one or more peers, wherein each peer of the one or more peers has previously participated with the user in one or more video game sessions;

generating a plurality of candidate highlights of a given peer of the one or more peers, wherein each candidate highlight of the plurality of candidate highlights comprises image data of one of the one or more video game sessions in which the user and the given peer participated together, wherein at least a part of each candidate highlight of the plurality of candidate highlights comprises image data of an in-game avatar of the given peer;

determining, based on one or more ranking factors, a total priority score for each generated candidate highlight of the plurality of candidate highlights, wherein the total priority score is determined by ranking each generated candidate highlight of the plurality of candidate highlights in accordance with each ranking factor of the one or more ranking factors and determining a priority score for each generated candidate highlight of the plurality of candidate highlights based on the ranking, wherein the total priority score comprises a combination of the priority scores;

selecting, as a selected highlight, a generated candidate highlight whose total priority score is a largest from among the plurality of candidate highlights; and rendering, for display, a list of one or more of the peer gaming profiles based on the peer profile data, wherein the list comprises the peer gaming profile of the given peer of the one or more peers and the selected highlight.

18. The non-transitory machine-readable storage medium of claim 17, wherein the list of one or more of the peer gaming profiles is rendered after the user has participated in the one or more video game sessions, and wherein the list comprises a plurality of selected highlights, including the selected highlight, wherein each selected highlights of the plurality of selected highlights are associated with an individual peer gaming profile of the one or more peer gaming profiles.

19. The non-transitory machine-readable storage medium of claim 17, wherein the plurality of candidate highlights comprises a first candidate highlight, wherein generating the first candidate highlight comprises:

identifying an in-game event having an in game volume meeting or exceeding a threshold volume;

determining a start time of the in-game event beginning a predetermined amount of time prior to the in-game event;

determining an end time of the in-game event ending another predetermined amount of time after completion of the in-game event; and generating the first candidate highlight by recording the in-game event from the start time to the end time.

* * * * *